CURRY & VANDOLAH.
Churn.
2 Sheets—Sheet 1.
No. 18,937.
Patented Dec. 22, 1857.
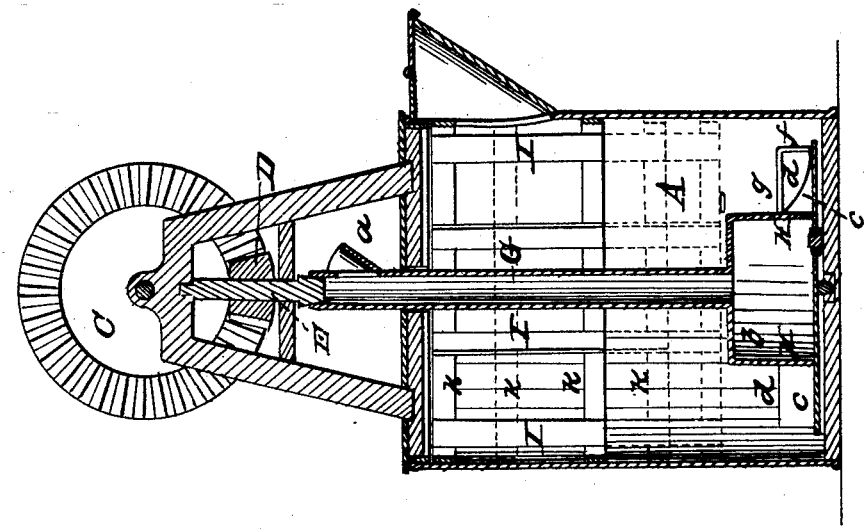
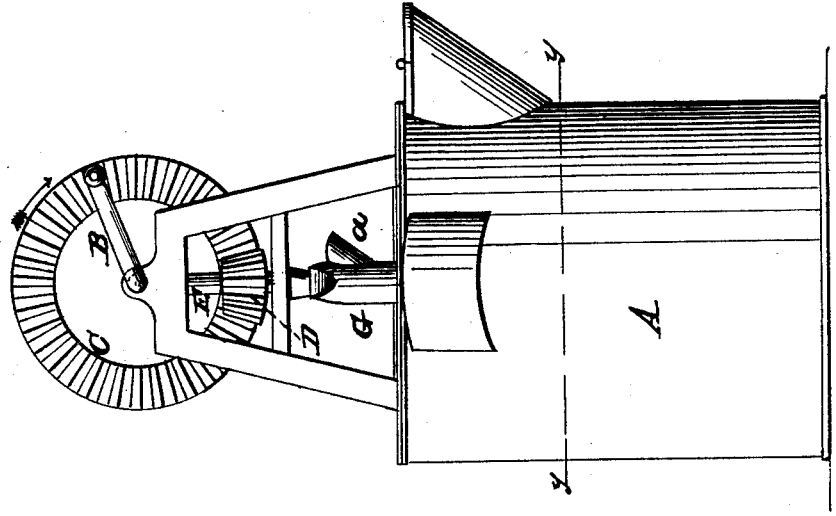

CURRY & VANDOLAH.
Churn.
No. 18,937.
2 Sheets—Sheet 2.
Patented Dec. 22, 1857.
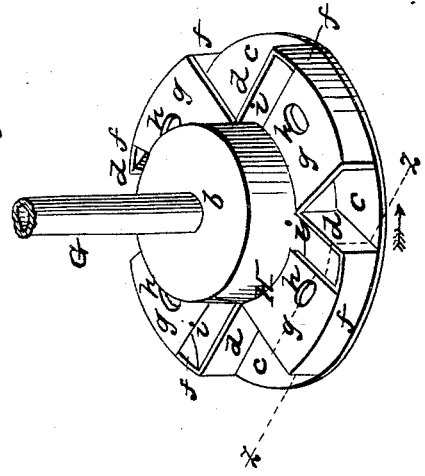
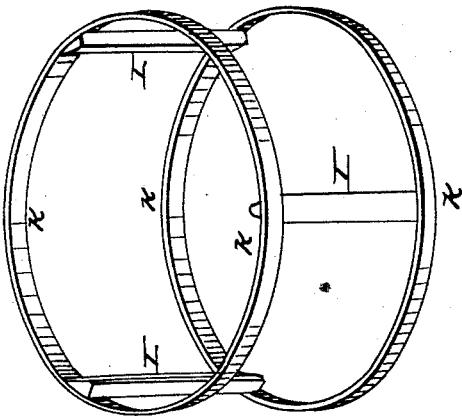
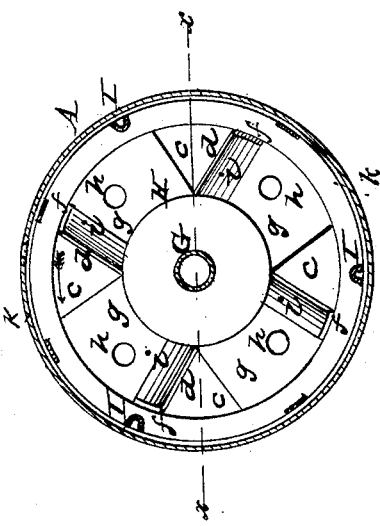
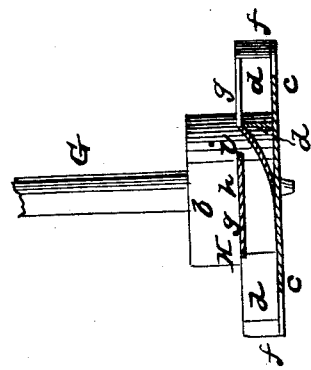

UNITED STATES PATENT OFFICE.

JAS. VANDOLAH AND ELIAS CURRY, OF DILLSBOROUGH, INDIANA.

CHURN.

Specification of Letters Patent No. 18,937, dated December 22, 1857.

*To all whom it may concern:*

Be it known that we, JAMES VANDOLAH and ELIAS CURRY, of Dillsborough, in the county of Dearborn and State of Indiana, have invented a new and Improved Churn; and we do hereby declare that the following is a full and exact description thereof, reference being had to the accompanying drawings, making part of this specification, Figure 1 being a side elevation of the churn; Fig. 2, a vertical section thereof in the plane indicated by the line *x x*, Fig. 3; Fig. 3, a transverse section thereof in the plane indicated by the line *y y*, Fig. 1; Fig. 4, a view in perspective of the dasher; Fig. 5, a vertical section of the dasher in the plane indicated by the line *z z*, Fig. 4; Fig. 6, a view in perspective of the removable and adjustable ribs.

Like letters designate corresponding parts in all the figures.

A cylindrical vessel, or tub, A, is provided, on the removable cover of which are mounted a winch B, and bevel wheel C, gearing into a bevel pinion D, whereby motion is communicated to a short vertical shaft E. The lower end of said shaft is suitably coupled to the upper end of the dasher shaft G. We employ for the dasher shaft a tube through which hot or cold water, as occasion may require, is poured into the hollow dasher. Into the upper end of this shaft opens a mouth *a*, to receive the water to be conveyed to the dasher H. Said dasher is secured to the bottom of the tubular shaft G; and from the center of its under side projects a small pivot or journal to turn in a step in the bottom of the churn.

The dasher is constructed in the following peculiar manner:—It has, in its center a hollow cylinder *b*, say of one half the diameter of the interior of the churn, and of sufficient height to contain a proper quantity of water for bringing the cream to the right degree of temperature. From the lower end of this cylinder, a broad rim *c*, extends nearly to the inner side of the churn; and upon this rim is secured a convenient number of wings *d, d*, say of half the height of the cylinder *b*, more or less. The front faces of said wings are nearly tangential to the periphery of the cylinder, from the front side thereof, as the dasher turns, and extend outward to the outer edge of the rim. A vertical, peripheral plate, or strip *f*, of the same height as the wings, extends backward from the outer end of each wing, along the outer edge of the rim, the greater part of the distance to the next succeeding wing. Horizontal plates *g, g*, extend from the top of the strips *f, f*, inward to the cylinder *b*, so as to cover all the space between said strips and the cylinder, except a portion immediately behind the wings, as represented in the drawings. The front of each wing is perpendicular or abrupt; but the rear surface slopes down to the rim *c*, behind. Small holes *h, h*, may be made in the horizontal plates *g, g*, to admit a free circulation of air.

The dasher revolves in the direction indicated by the arrow in Fig. 4; and its motion causes the cream to strike against the abrupt faces of the wings. The cream is then drawn up over said wings, and down through the apertures *i, i*, by the partial vacuum created beneath the plates *g, g*. It then strikes the next wing in succession, and passes over it in a similar manner, and so on continually, being put in violent agitation thereby. The horizontal plates *g, g*, at the same time, prevent the agitated cream below from much intermingling with the cream above; and the butter, as fast as it is produced and floats on the top of the cream, is kept from descending beneath said plates and therefore does not impede the action of churning.

We employ a set of ribs I, I, arranged and acting in connection with the dasher as follows:—A suitable number (say three or four,) of them is placed vertically against the inside of the vessel A, so that their lower ends will extend a little distance below the surface of the cream, but never so low as to reach the dasher, which revolves freely beneath them. When the ribs are thus arranged, and the dasher revolves, a series of streams is produced in the motion of the cream, of the following nature:—As the upper portion of the cream, when in rapid motion, approaches the ribs, it is caused by the resistance of said ribs to rise considerably above the ordinary surface of the cream; and being drawn in around them, thence plunges downward beneath the succeeding ribs; then rises and plunges again alternately and continually. Thus there is a constant interweaving of streams, thereby causing much air to be forced into the cream, and producing so violent an agitation, that butter is almost invariably produced in from one minute to three minutes, when the cream is at the proper temperature. This agitation is principally produced by the arrangement of the ribs I, I, descending only part way down the sides of the churn, in connection with the revolutions of the dasher below them. If the ribs should extend to the bottom of the churn, no such action would be produced; nor if the ribs should not extend down to the cream. In order, therefore, to insure the proper action of the ribs it is necessary to keep their lower ends at a short and nearly uniform distance below the surface of the cream; and since the quantity of cream at different churnings ordinarily varies considerably, we arrange them so as to be raised or lowered to adapt them to the various heights of the cream. To effect this object the ribs are secured to hoops $k$, $k$, as represented in Fig. 6. These hoops are made to fit closely to the inside of the churn A, so that when moved to any position therein, they will retain their place. Or they may be divided in one place, and possess elasticity sufficient to spring outward against the churn and thereby hold them in any desired position. This arrangement also enables the ribs to be taken out of the churn to be cleaned, and for greater facility in cleaning the churn itself.

What we claim as our invention and desire to secure by Letters Patent, is—

1. The construction of the dasher with the rim $c$, wings $d$, $d$, peripheral strips $f$, $f$, and horizontal plates $g$, $g$, arranged and operating substantially in the manner and for the purposes herein specified.

2. We also claim the arrangement of the ribs I, I, with retaining hoops $k$, $k$, or their equivalents, so as to render them adjustable and removable, substantially as, and for the purposes, herein specified.

The above specification of our improved churn, signed by us this 17th day of September, 1857.

JAMES VANDOLAH.
ELIAS CURRY.

Witnesses:
THOMAS C. JOHNSON,
ELLIOT MILLS.